United States Patent
Dorian et al.

(12) 
(10) Patent No.: US 6,571,256 B1
(45) Date of Patent: May 27, 2003

(54) METHOD AND APPARATUS FOR PROVIDING PRE-SCREENED CONTENT

(75) Inventors: Paul Jacob Dorian, San Jose, CA (US); Joseph Salvatore Drago, San Jose, CA (US); Peter Dorian, San Jose, CA (US)

(73) Assignee: Thekidsconnection.com, Inc., San Jose, CA (US)

( * ) Notice: Subject to any disclaimer, the term of this patent is extended or adjusted under 35 U.S.C. 154(b) by 0 days.

(21) Appl. No.: 09/507,217

(22) Filed: Feb. 18, 2000

(51) Int. Cl.[7] .............................................. G06F 7/00
(52) U.S. Cl. ..................................... 707/104.1; 707/10
(58) Field of Search .......................... 707/1, 10, 104.1

(56) References Cited

U.S. PATENT DOCUMENTS

| | | | | |
|---|---|---|---|---|
| 5,678,041 A | * | 10/1997 | Baker et al. | 707/10 |
| 5,987,606 A | * | 11/1999 | Cirasole et al. | 713/200 |
| 5,996,011 A | * | 11/1999 | Humes | 709/206 |
| 6,035,332 A | * | 3/2000 | Ingrassia et al. | 709/218 |
| 6,065,055 A | * | 5/2000 | Hughes et al. | 709/229 |
| 6,286,001 B1 | * | 9/2001 | Walker et al. | 707/9 |

OTHER PUBLICATIONS

CYBERSitter For a Family Friendly Internet, Feb. 1999, Http: web.archive.org/web/19990220150359/www.cybersitter.com/cybinfo.htm.*

McCarthy, S.P. Use Internet filters to erase the hate from classroom computers, May 24, 1999, Government Computer News.*

Chen Ding et al. Centralized Content–Based Web Filtering and Blocking: How Far Can It Go? 1999 IEEE Inter. Conf. on Systems, Man, and Cybernetics, vol. 2, PP 115–119.*

* cited by examiner

*Primary Examiner*—Jack Choules
(74) *Attorney, Agent, or Firm*—Blakely, Sokoloff, Taylor & Zafman, LLP

(57) ABSTRACT

A method of providing only pre-screened content is described. The method includes maintaining a database on a server including a plurality of pre-screened sites. When a universal resource locator (URL) is received, the method verifies that the URL represents one of the plurality of pre-screened sites. If the URL represents one of the plurality of prescreened sites, displaying data associated with the URL, otherwise, not displaying the data.

26 Claims, 16 Drawing Sheets

METHOD AND APPARATUS FOR PROVIDING PRE-SCREENED CONTENT

FIELD OF THE INVENTION

This invention is about accessing the World Wide Web, and in particular it's about providing a server based pre-screening for sites being accessed.

BACKGROUND

As the World Wide Web (Web, WWW) is becoming more and more ubiquitous, children are starting to use it, for school, research, or fun. Although many web sites are designed to be useful to and appeal to children, there are numerous web sites that are not appropriate for children. For example, there are many web sites show pornography or violence, or which have other content that is not appropriate for children. There are also web sites through which a child could potentially purchase items which parents would have to pay for. Other sites that should not be viewed by children abound. Additionally, certain parents do not want their young children to view other sites, such as News, certain types of religious or cult sites, etc.

Similar applications may be useful in a corporation, where the corporation does not wish its employees to view certain sites.

A prior art solution to this are downloadable client based programs such as NetNanny. Such programs permit the parent to download a listing of "appropriate" web sites. When a user selects a web site that is not listed as "appropriate" the program requires a password. Thus, for example, the parents would have a password, so they could access web sites that are not in the "appropriate" list. However, the children would not have this password.

However, there are a number of problems with such a client-based system. First, if a web site changes from being appropriate to being inappropriate, the parent must download the new listing of appropriate sites, which no longer would include that web site. If the parent fails to download the new listing, the child may be given access to a site which is inappropriate. Furthermore, because the list of sites is maintained on the parent's computer, the same process has to be repeated for each computer that is accessible to members of the household. In addition, because the list of sites is maintained on the parent's computer, an older child could possibly add sites to the list of appropriate sites, and thus corrupt the system.

SUMMARY

A method of providing only pre-screened content is described. The method includes maintaining a database on a server including a plurality of pre-screened sites. When a universal resource locator (URL) is received, the method verifies that the URL represents one of the plurality of pre-screened sites. If the URL represents one of the plurality of prescreened sites, displaying data associated with the URL, otherwise, not displaying the data.

LIST OF FIGURES

The present invention is illustrated by way of example, and not by way of limitation, in the figures of the accompanying drawings and in which like reference numerals refer to similar elements and in which.

DETAILED DESCRIPTION

A method and apparatus for providing pre-screened content is provided. Each universal resource locator (URL) that is "approved" is stored on a server, and when a client wishes to access the URL, the server is queried to determine whether the client should display the data associated with the URL. This method may be used advantageously to provide pre-screened content for children, within a corporation, or in other situations where access should be limited to certain sites. By providing the list of approved sites on the server, changes to the list of approved sites can be made without requiring effort on the part of a user. Furthermore, web sites that are already on the list of approved sites can be reverified to verify that the content has not changed from appropriate to inappropriate. For one embodiment, the system may further permit a user to add additional pages that are not approved, or remove pages that have been approved.

Figure 1:
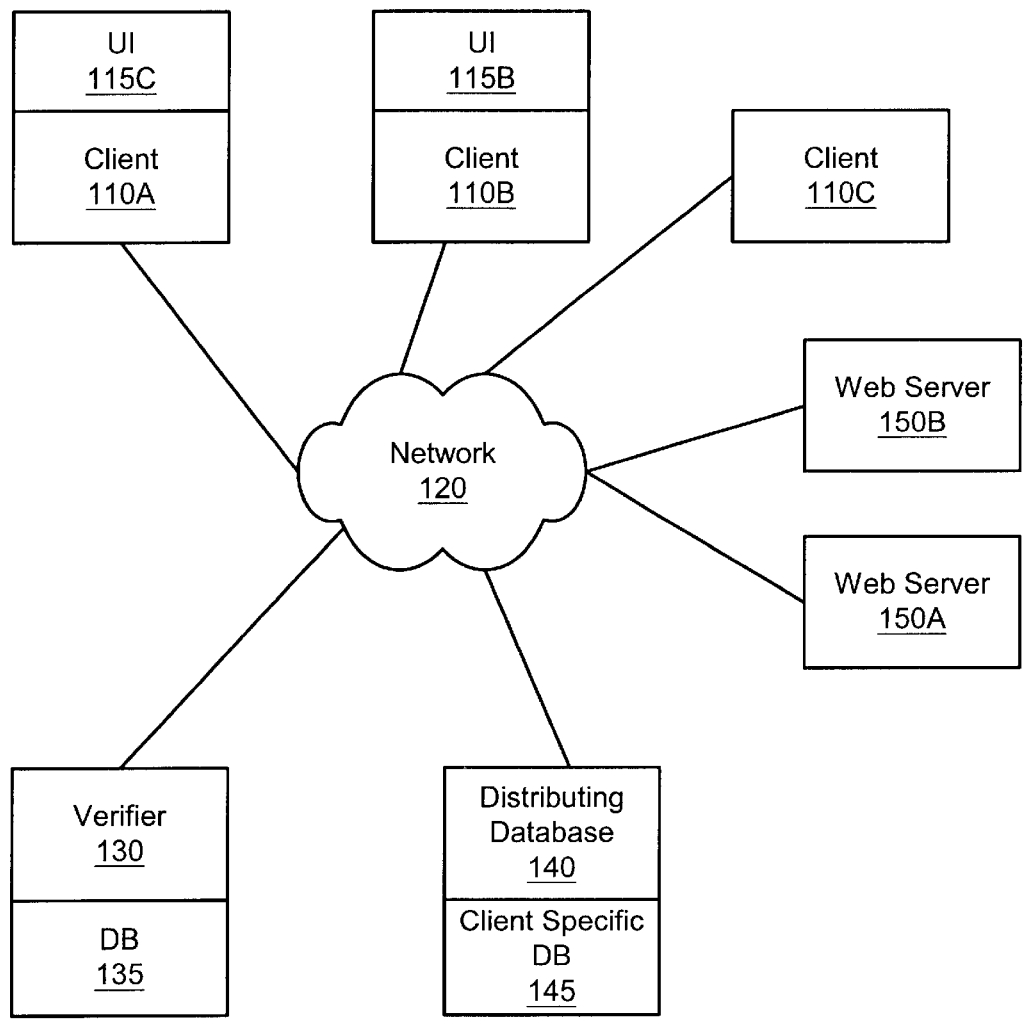
FIG. 1 is a block diagram of a network on which the present invention may be implemented.

FIG. 1 is a block diagram of a network on which the present invention may be implemented. A client 110A may have a user interface 115A installed, to permit a child, or other person who should be provided only pre-screened content, to connect to various web sites 150A, 150B. When the client 110A connects to a web site 150A, he or she does so through a network 120. The client 110A may access the network through a modem, a digital subscriber line (DSL), a local area network (LAN), a wide area network (WAN) or through other means. Generally, the client 110A would use a browser, such as Microsoft's Internet Explorer or Netscape's Navigator or Communicator. When the client invokes the browser, and types or otherwise selects a URL associated with a particular web site 150A, the system connects to a database 135, 140. For one embodiment, only a single database 135 may be used to store all of the relevant data. For another embodiment, the database may be distributed over multiple systems 140.

In either case, the client's system 110A connects to a database 135, 140, 145 to verify whether the selected URL may be displayed to the client 110A. If the selected URL may be displayed to the client 110A, the client 110A is permitted to connect to the web site 150A. If the selected URL may not be displayed to the client, the client 110A is not permitted to connect to the web site 150A. For one embodiment, an informative dialog may be displayed to the client 110A, explaining that the selected URL is not available because it is not approved by the pre-screening program. This provides the client 110A an opportunity to shut down the pre-screening program.

For one embodiment, a verifier 130 may further be coupled to the network 120. The verifier 130 verifies each of the sites added to a list of approved sites. For one embodiment, the verification process is used when a web site is initially added to the list of approved sites. For another embodiment, the verification process may further be used on a regular basis to reverify sites already on the list of approved sites. The process of verification is described in more detail below.

Figure 2:
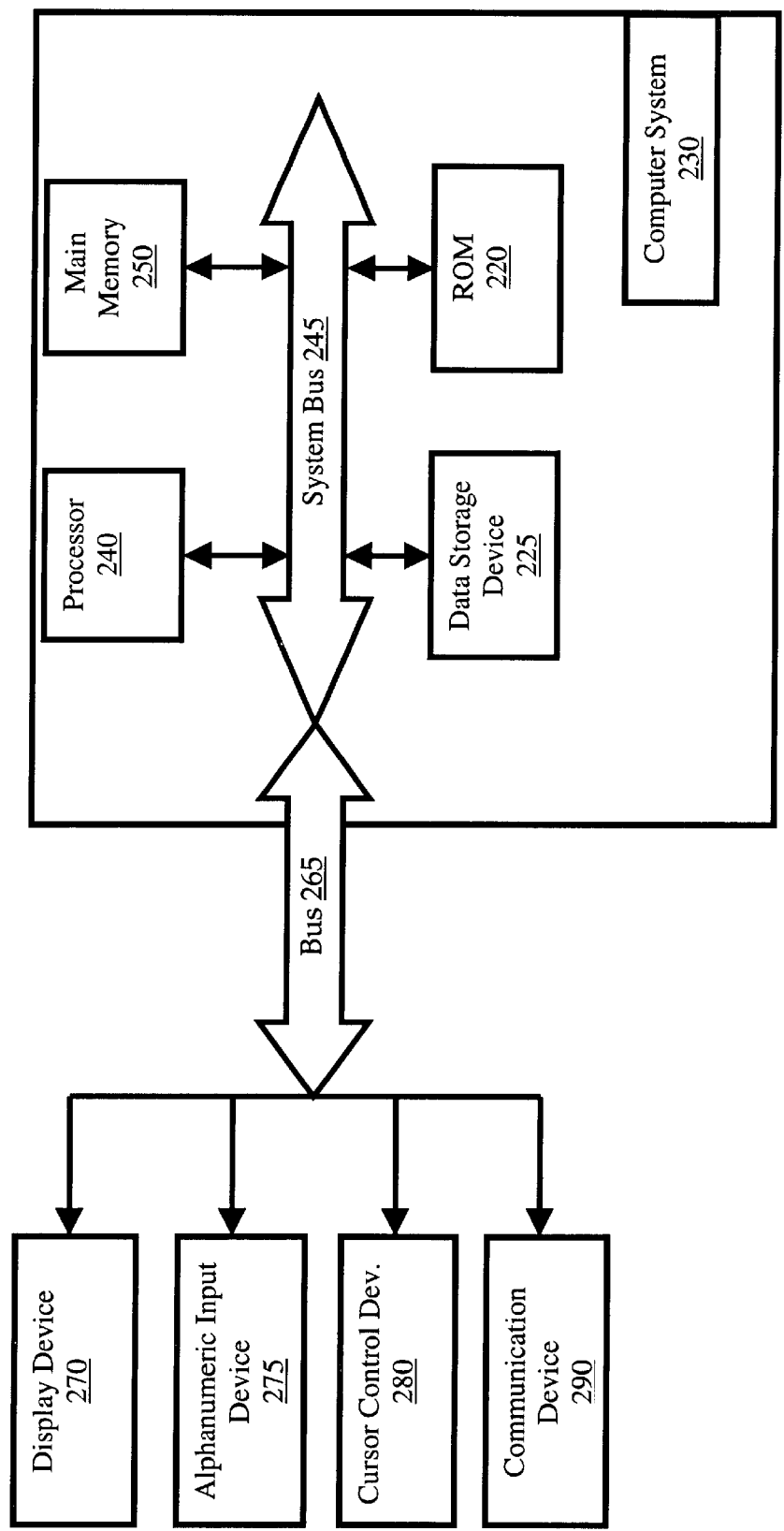
FIG. 2 is a block diagram of a computer system on which the present invention may be implemented.

FIG. 2 is a block diagram of a computer system on which the software of the present invention may be implemented. FIG. 2 is one embodiment of computer system on which the present invention may be implemented. FIG. 2 illustrates a typical data processing system upon which one embodiment of the present invention is implemented. It will be apparent to those of ordinary skill in the art, however that other alternative systems of various system architectures may also be used.

The data processing system illustrated in FIG. 2 includes a bus or other internal communication means 245 for communicating information, and a processor 240 coupled to the bus 245 for processing information. The system further comprises a random access memory (RAM) or other volatile storage device 250 (referred to as memory), coupled to bus 245 for storing information and instructions to be executed by processor 240. Main memory 250 also may be used for storing temporary variables or other intermediate information during execution of instructions by processor 240. The system also comprises a read only memory (ROM) and/or static storage device 220 coupled to bus 240 for storing static information and instructions for processor 240, and a data storage device 225 such as a magnetic disk or optical disk and its corresponding disk drive. Data storage device 225 is coupled to bus 245 for storing information and instructions.

The system may further be coupled to a display device 270, such as a cathode ray tube (CRT) or a liquid crystal display (LCD) coupled to bus 245 through bus 265 for displaying information to a computer user. An alphanumeric input device 275, including alphanumeric and other keys, may also be coupled to bus 245 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 240, and for controlling cursor movement on display device 270.

Another device, which may optionally be coupled to computer system 230, is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate in accordance with the methods and teachings herein.

The software of the present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
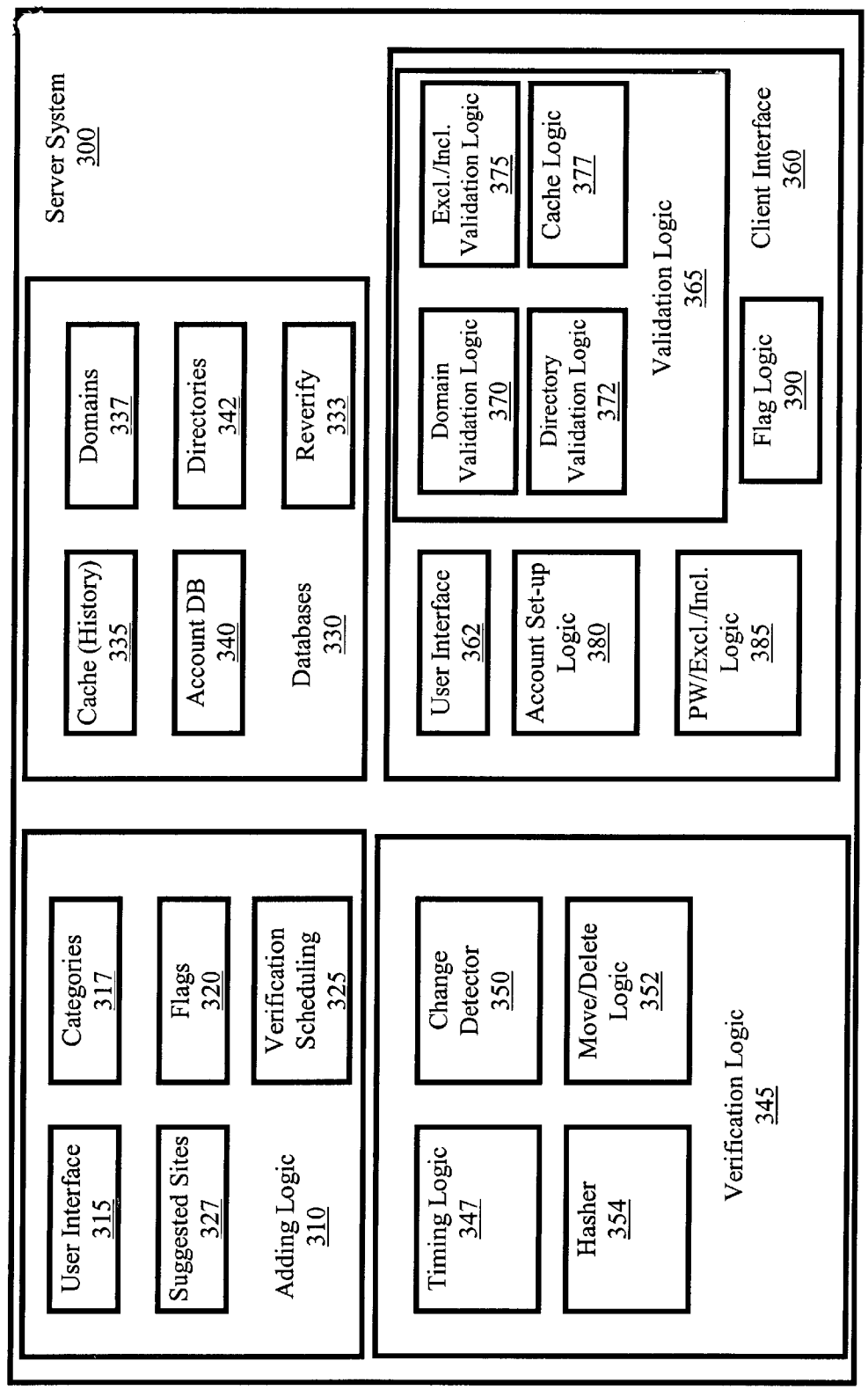
FIG. 3 is a block diagram of one embodiment of a server for the present invention.

FIG. 3 is a block diagram of one embodiment of a server for the present invention. The server system 300 includes adding logic 310 for adding new sites to the list of approved sites. The server system 300 further may include verification logic 345 for verifying existing sites, if the sites have changed. The server system 300 further includes a client interface 360, which permits a client to access sites corresponding to URLs which are in the databases 330, and to sign up for this service.

Adding logic 310 includes a user interface 315, permitting authorized users to log into the adding logic 310. For one embodiment, authorized users are employees only. Using the user interface 315, the authorized users can add new sites to the database, can reverify sites in the reverification database 333, and can verify sites in the suggested sites list 327.

For one embodiment, the adding logic 310 further includes a plurality of categories. For one embodiment, each new site is added to a category. Categories may, for example, include sports, entertainment, educational, etc. For one embodiment, categories are hierarchical, and thus the category sports may further include a number of specific types of sports. The authorized user may select a particular category for the new site, or may add a new category, if the site does not fit into any of the existing categories.

For one embodiment, the authorized user is further prompted to add a description for the new site. This description is made available to a user who wishes to visit the site, and may be made available to a client who wishes to exclude certain sites, as will be described below.

For one embodiment, the adding logic 310 further includes flags. For one embodiment, the flags are:

D—entire Domain is approved, no need to check each directory specifically;

L—check each directory specifically against directory database;

E—check exclusion list (this is set when a single page is restricted); and

R—check each directory against directory database and check exclusion list (L+E).

For one embodiment, these flags are automatically updated upon reverification. However, the flag is initially set by the authorized user when the site is added to the database of approved sites.

For one embodiment, the adding logic 310 further includes a verification scheduling logic 325. Verification scheduling logic 325 permits the authorized user to select when/how often a site should be reverified. For one embodiment, certain sites need never be reverified. These sites may include sites having a "Approved Content Only" indicator. For one embodiment, the present system may supply such indicators to subscribing sites. This sites may be emphasized to the user. For one embodiment, this may be a subscription based service. This is described in more detail below with respect to FIG. 13. Other sites, based on the content, frequency of updates, and other factors, may be reverified weekly, by-weekly, monthly, or on some other schedule set by the authorized user.

The server system 300 includes databases 330. For one embodiment, these databases 330 may be distributed databases located on various servers. The implementation of such distributed databases is known in the art. For one embodiment, the databases 330 are Oracle databases. If the databases 330 are distributed databases, when information is changed in a database such change is reflected in every copy of the database.

For one embodiment, the databases 330 includes a cache database 335 that includes copies of a number of sites that have been recently accessed. For one embodiment, the cache database 335 is user specific, i.e. each user has a list of sites that have been recently accessed. In that instance, if a URL is found in the cache 335, there is no need to check the exclusions database 340, the URL can simply be displayed. For another embodiment, the cache database 335 is not user specific, but rather applies to all users. As discussed below, the cache 335 may be modified by verification logic 345. For one embodiment, a user specific cache database maintains a list of the last hundred sites visited by the user. For one embodiment, the user specific cache database may be cleared when the session is ended.

For one embodiment, there is no cache database, and a cache is maintained on the user's system, and not on the server. For one embodiment, the cache database may be cleared when the session is ended, or may time out after a preset period of time, such as 5 hours.

The databases 335 further include a list of domains 337 that are part of an approved URL. For one embodiment, these domains include the flags described above, to indicate whether the system should also look at the list of directories 342 associated with the domain in question, or whether all directories associated with the domain in the domain list 337 are approved. For one embodiment, the domains 337 and directories 342 are maintained in a database.

The databases 330 may further include an account database 340 with data for a plurality of users. The account database 340 may include password information, configuration information, and other information. The account database 340 may further include user specific inclusions and exclusions, for one or multiple accounts. As will be discussed below, a master user can request specific exclusions from and additions to the approved sites. For one embodiment, the exclusions and additions may be different for each of multiple accounts. For example, a parent may wish to exclude the entire category of News, or Wrestling, or another category for a younger child, while specifically including certain other sites for an older child. This account database is maintained on the server, but is edited by the master user through the client interface 360.

A reverify database 333 may further be included. The reverify database 333 includes the information about those sites which have changed since they were last verified, and thus should be reverified. This process is described below with respect to the verification logic 345.

The verification logic 345 may also be a part of server system 300. As described above, a site may have a scheduled reverification period. The timing logic 347 determines when it is time to reverify certain sites. For one embodiment, the timing logic 347 constantly looks for those sites in the database that are due for reverification. For another embodiment, the database 330 sends information on sites that are due for reverification to the verification logic 345.

For one embodiment, the hasher 354 creates a "hash" of the site, as it current stands. For one embodiment, the hasher 354 creates a CRC, or similar numerical value representing the current contents of the site. For another embodiment, the hasher 354 may create another type of indicator to represent the current contents of the site. The change detector 350 compares the new hash with a stored hash associated with the site. A hash is created of the site when the site is first verified. This hash is stored in the database. The change detector 350 determines whether the new hash is substantially different from the stored hash. For one embodiment, this may be a simple comparison, where if the content of the new hash is more different then a preset threshold, the site is considered to be different. For another embodiment, this comparison may be more complex, evaluating the types of new information in the web site. For example, the hash may store a list of links/images/text blocks on the web site, and the change detector 350 may compare whether the changes are substantial.

If the changes are substantial, the move/delete logic 352 copies the URL to the reverify database 333, and removes the URL from the domains/directories databases 337, 342. In this way, the URL becomes inaccessible until it is reverified, as described below.

The server system 300 may further include client interface 360. The client interface 360 includes a user interface 362. The client interface 360 permits various users to log in, including a master user, and one or more other users. The client interface 360 includes a validation logic 365 to determine a URL that a user wishes to access is approved. The validation logic 365 includes a domain validation logic 370, directory validation logic 372, exclusion/inclusion validation logic 375, and cache logic 377. The use of these logics to validate a URL is described in more detail below.

The client interface 360 further includes an account set-up logic 380 to set up a new account. The client interface 360 may further include a Password/Exclusion list logic 385, which permit a user to log into the server, and alter his or her password, and a master user to alter/add to his or her inclusion and exclusion list. This is described in more detail below.

The flag logic 390 alters the flags in the databases 330, if the results of the reverification result in an alteration of the status of the site.

Figure 4:
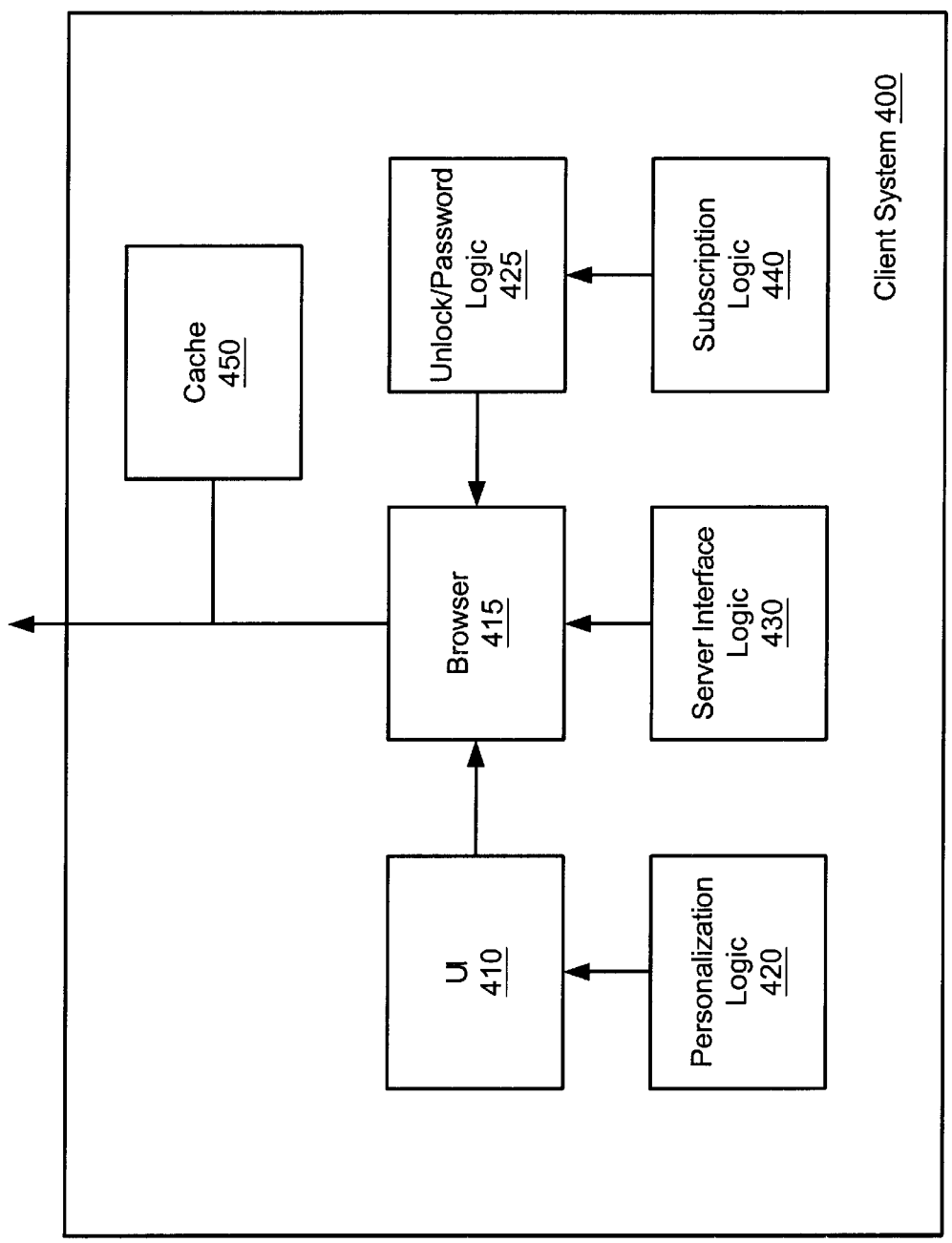
FIG. 4 is a block diagram of one embodiment of a client for the present invention.

FIG. 4 is a block diagram of one embodiment of a client system for the present invention. The client system 400 includes a user interface 410. For one embodiment, the user interface is complex and includes personalization logic 420 to personalize the layout loaded when the system is invoked, as described below. For one embodiment, the user interface includes an icon in the system tray, permitting easy invocation of the software. The client system 400 further includes a browser 415 which permits access to a network/server. For another embodiment, the system may not include a browser 415, and the access to the network may be a custom access.

The client system 400 further includes unlock/password logic 425. For one embodiment, the unlock/password logic 425 permits each of multiple users to log into the system, and set the preferences for him or herself. The unlock/password logic 425 further permits a master user to log in and change settings or the master password. For one embodiment, the client system 400 is an ActiveX control, which includes a locked DLL file, only allowing a "Read" permission. When the DLL is sent the current password, it is unlocked, permitting changes to the client system 400. For one embodiment, the password is maintained on the server, to make it difficult to hack into the system.

Subscription logic 440 tracks the subscription of the user, and permits the user to alter subscription information. It is accessible only once the master password has been entered.

Server interface logic 430 calls upon the validation logic on the server, and other information on the server. The server interface logic 430 intercepts all attempts to connect to a web site, and validates the selected URL, prior to permitting the browser 415 or user interface 410 to display the data associated with the URL.

For one embodiment, in a system running Internet Explorer by Microsoft, the server interface logic 430 is an ActiveX control called "Browser Helper Object" that attaches a copy of this control to each process in the browser. All calls are intercepted by the server interface logic 430, and forced to be validated through the server described above.

Client system 400 may further include cache 450. Cache 450 stores URLs of sites that were recently accessed, or attempted to be accessed. For one embodiment, the cache stores the URL and the flag associated with the site. The cache 450, for one embodiment, is purged after each session. For one embodiment, the cache 450 may be automatically cleared after a set period of time. During one session, if a site has already been visited by the user, and thus the site is in the cache 450, access to the site is permitted without searching the databases in the server. This reduces traffic to the server, and speeds up access for the user.

Figure 5:
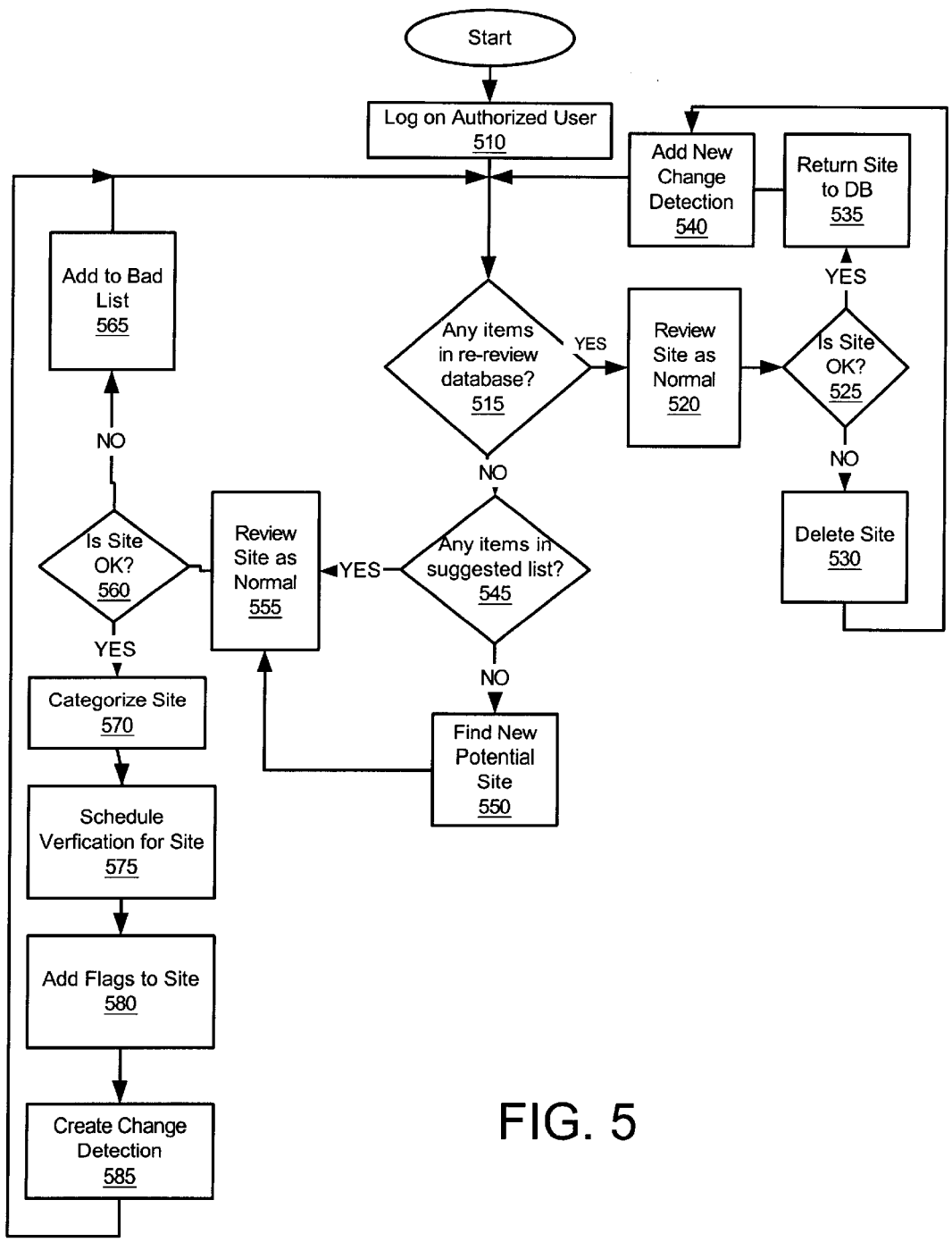
FIG. 5 is a flowchart of one embodiment of the process of adding sites to the list of pre-approved sites.

FIG. 5 is a flowchart of one embodiment of the process of adding sites to the list of pre-approved sites. The process starts at block 505. At block 510, an authorized user logs on to the system. For one embodiment, only certain computers may be used to log onto this system. In other words, for one embodiment, client computers can not log onto the system as authorized users for this process.

At block 515, the process determines whether there are any items in the reverify database. If there are items in the reverify database, the process continues to block 520.

At block 520, the site is reviewed. At block 525, the authorized user determines whether the site is acceptable as a pre-screened site. If the site is not acceptable, the process continues to block 530. At block 530, the site is deleted. For one embodiment, the site may further be placed in a list of unacceptable sites, to make sure that it is not reviewed again for at least a period of time. The process then returns to block 515.

If the site is acceptable, the process continues to block 535, and the site is returned to the domain/directory databases, such that clients can now access the site. At block 540, for one embodiment, a new change detection information is created for the site, and is included in the database. This change detection information is the hash, a snap-shot of the site, or other information that may be used to detect whether the site has changed, as will be described below. The process then returns to block 515.

If, at block 515, no items were found in the reverify database, the process continues to block 545. At block 545, the process determines whether there are any items in the suggested list. For one embodiment, users can suggest additional sites for approval. In this way, the sites that users wish to see are screened, and if appropriate, allowed. If there are items in the suggested list, the process continues to block 555.

If there are no items in the suggested list, the process continues to block 550. At block 550, a new potential site is found by the authorized user. For one embodiment, this process may be automated, by retrieving sites that are suggested to be child-friendly, or appropriate in other ways, by various search engines. The process then continues to block 555.

At block 555, the site is reviewed. For one embodiment, reviewing a site includes reviewing the main page (at an exact address, for example www.thekidsconnection.com), and reviewing pages or other data that is linked from that site.

At block 560, the process queries whether the site has been found to be appropriate or not. If the site was found not appropriate, the process continues to block 565. The site is not added to the list of acceptable sites. For one embodiment, the site may further be placed in a list of unacceptable sites, to make sure that it is not reviewed again for at least a period of time.

If at block 560, the site is found to be appropriate, the process continues to block 570. At block 570, the site is categorized. The categories are a hierarchical organization of acceptable categories. For example, one category may be "Sports" which may include subcategories of specific sports, specific teams, specific players, or specific types of games. For example, one category may be:

Sports—Football—49ers—Quarterbacks, alternatively, for the same site, the categorization may be:
Sports—Football—Quarterbacks. Using such categorizations is known in the art. For one embodiment, comments are also added to the site at this point. For example, for a site about 49ers Quarterbacks, the comment may be "Fan Site for Steve Young, with interesting links." These comments are written by the authorized user, and are associated with the specific site in the database.

At block 575, a verification is scheduled. For one embodiment, verification scheduling depends on the type of site being visited. Thus, for example, if the site is a site that rarely changes, less frequent verification may be scheduled. For other sites that change more often, frequent verification may be valuable. For some sites, verification may be unnecessary.

At block 580, flags are generated for the site. The flags indicate whether the entire domain was found acceptable, whether specific pages within the domain are excluded, or whether individual directories/pages within the domain should be checked. For one embodiment, the authorized user can specifically indicate pages that should be restricted, such as chat rooms, newsgroups, shopping, etc. The system also automatically determines whether the category into which the site was placed is excluded by any user.

At block 585, change detection information is created for the site. As described above, this change detection information is used in verification, to determine whether the site has changed sufficiently to require a reverification of the site. The process then returns to block 515.

This flowchart describes the process of verifying sites in a sequential manner. It is to be understood that the order of operations may be altered. In other words, for example, one authorized user may only verify items in the suggested list, and thus not perform steps 515 and 550 at any time. Additionally, any of the steps described, such as scheduling verification, adding flags, categorizing sites may be excluded from the actual verification process or automated. This flowchart merely represents one example of a verification procedure.

Figure 6:
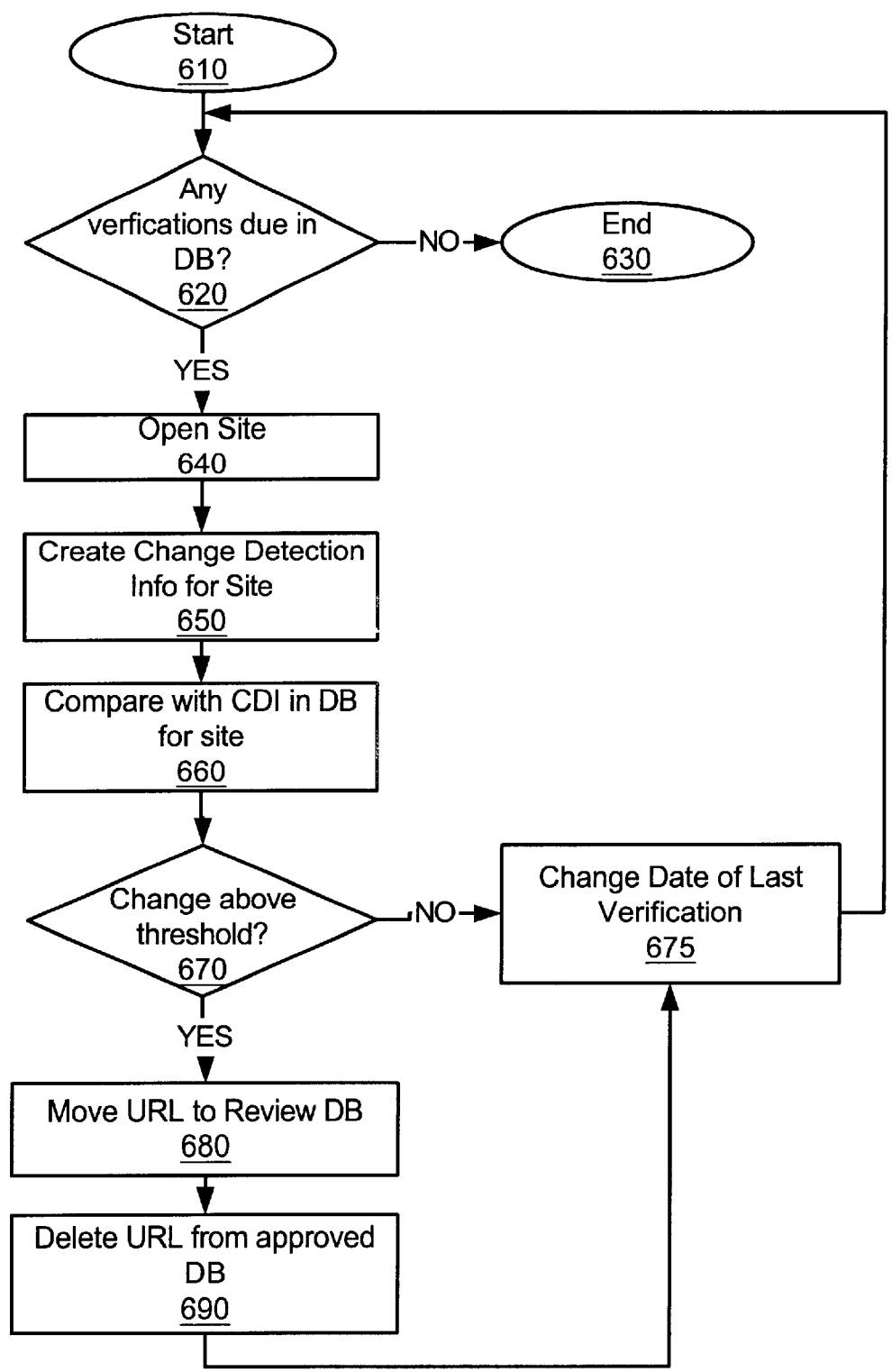
FIG. 6 is a flowchart of one embodiment of the verification process.

FIG. 6 is a flowchart of one embodiment of the verification process. The process starts at block 610. At block 620, the process determines whether there is any verification due in the database. For one embodiment, the database automatically sorts sites by the verification due date, and determines whether any sites are due for verification. If no sites are due, the process continues to block 630, and ends.

If one or more sites are due for verification, the process continues to block 640. At block 640, the site is opened. At block 650, change detection information (CDI) is created for the site. As discussed above, this information may be a CRC, a hash, a list of images, links, and text on the page, or other information. For one embodiment, this information may also include the date on which the last change was made to the site.

At block 660, the newly created CDI is compared with the CDI in the database for the site.

At block 670, the process determines whether the change is above a threshold. For one embodiment, this may be a two step process. First, the system may determine if the site has not been altered at all since the last verification (based on the date of the last edit). Second, only if the site has been altered may other information be compared to determine whether the changes are substantive or not. For one embodiment, the threshold for substantive changes may be set based on the importance of screening out unacceptable sites. If it is preferred that no even potentially unacceptable sites are included in the database, any change may be held to be a substantial change. Alternatively, if a more complete database is preferred, even if some potentially not-so-great sites are included, more change may be permitted prior to determining that the change is above a threshold.

If the change was below the threshold, the process continues to block 675. At block 675, the date of the last verification is changed to the current date, the CDI is updated, and the site remains in the database, reverified. For one embodiment, the past CDs remain in the database, such that change sets may be tested against the current CDI as well as past CDs. This may prevent a site from changing in small increments over a period of time while remaining in the database of acceptable sites. The process then returns to block 620.

If the change was above the threshold at block 670, the process continues to block 680. At block 680, the URL is moved to the reverify database. At block 690, the URL is deleted from the database of approved web sites. In this way, users can no longer access the site until the site has been reverified, as described above with respect to FIG. 5. The process then continues to block 620, described above.

Figure 7:
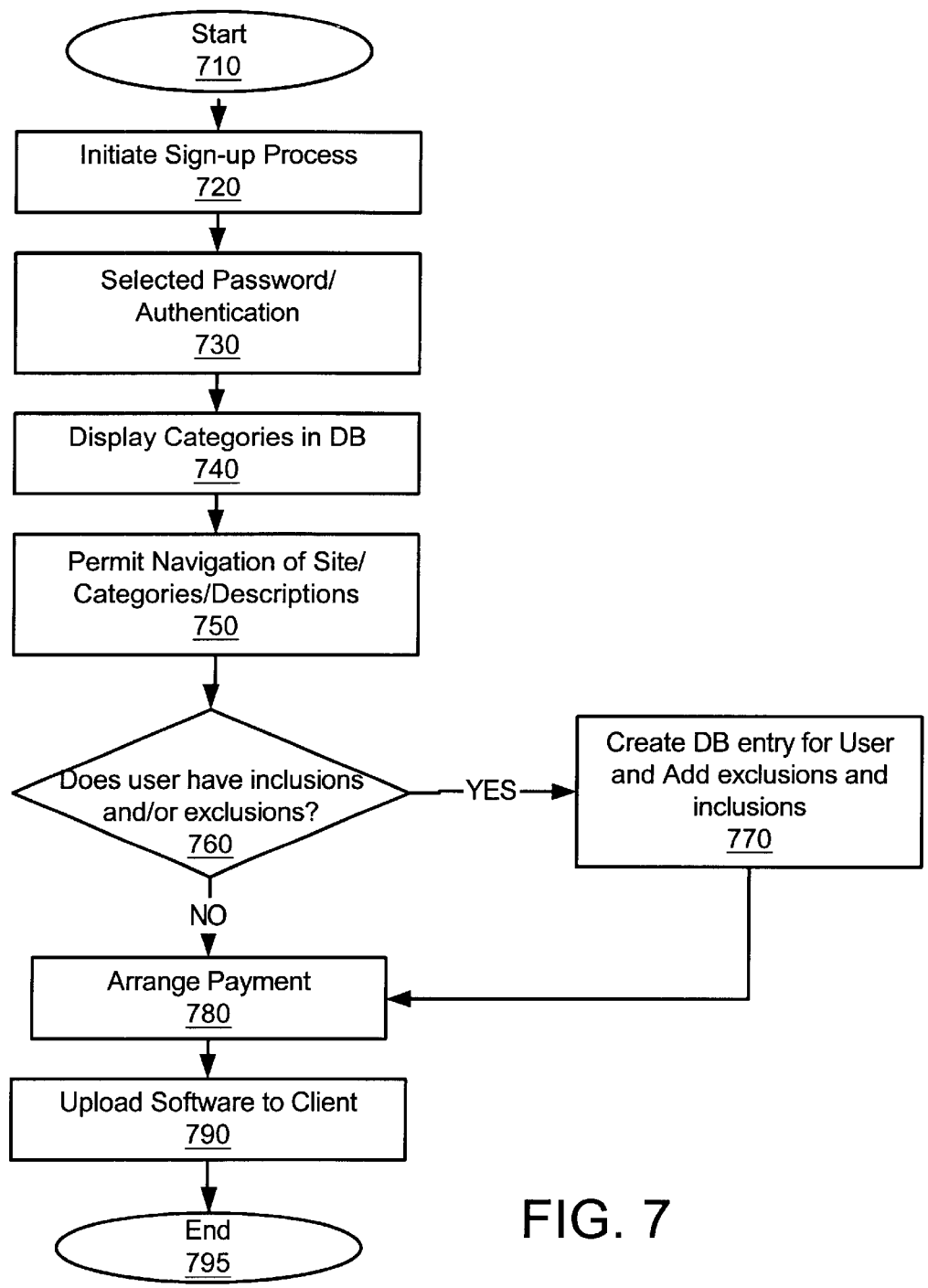
FIG. 7 is a flowchart of one embodiment of the process of setting up an account.

FIG. 7 is a flowchart of one embodiment of the process of setting up account(s). The process starts at block 710, when a user logs on to the server. A new user always creates a master account, which sets the preferences for all of the other accounts on the system. For one embodiment, the accounts on the system may include multiple access levels. For example, a small child may be provided access to only educational web sites and certain limited entertainment web sites, while an older child may be allowed to visit all sites except for shopping sites and violent sites. At block 720, the sign-up process is initiated.

At block 730, the user is prompted to select a master password or method of authentication. For one embodiment, a password of a certain length may be required. For another embodiment, biometric data may be used for authentication, such as a fingerprint, iris scan, video image scan, or other similar data. The purpose of the master password is to ensure that only the master user can alter settings in the system, and can access sites that are not pre-screened.

At block 740, the categories in the database are displayed to the user. At block 750, the user is permitted to navigate among the categories, sites, and descriptions in the database. This gives the user information about what pre-approved sites exist in the database. The master user is permitted at this point to exclude certain sites or categories from the accounts on this or her system.

At block 760, the process determines whether the user elected to exclude certain sites or categories. If the user elected to exclude or include certain sites or categories, the process continues to block 770. At block 770, a database entry is created for the user in the accounts database, and the user's selections are added to the account database. The process then returns to block 780.

At block 780, payment is arranged. For one embodiment, this system may be a subscription system. In that case, the payment may be an automatic debit of a credit or debit card.

At block 790, the client portion of the software is uploaded to the client system. The user can now personalize his or her interface, and can use the system to visit pre-screened sites. The process ends at block 795.

It is foreseen that the present application may be useful in schools, libraries, or at home in situations where a child may access the Internet through a computer. In that instance, the user who signs up as described above is a teacher, librarian, or parent, who adds the system to a computer accessible to the child.

For another embodiment, the application may be used within the corporation, to restrict certain employees from browsing unacceptable sites. In that instance, the user who signs up would be a system administrator, who downloads the client portion of the system to the corporate server. Alternatively, a separate system may be set up inside a corporation, such that the server, databases, and client systems are all within the corporation's LAN or WAN. In that instance, certain steps may be skipped, such as adding includes and exclusions, arranging payments, and uploading client software, since the entire system may be run from the server that provides access to sites outside the corporate entity.

Figure 8A:
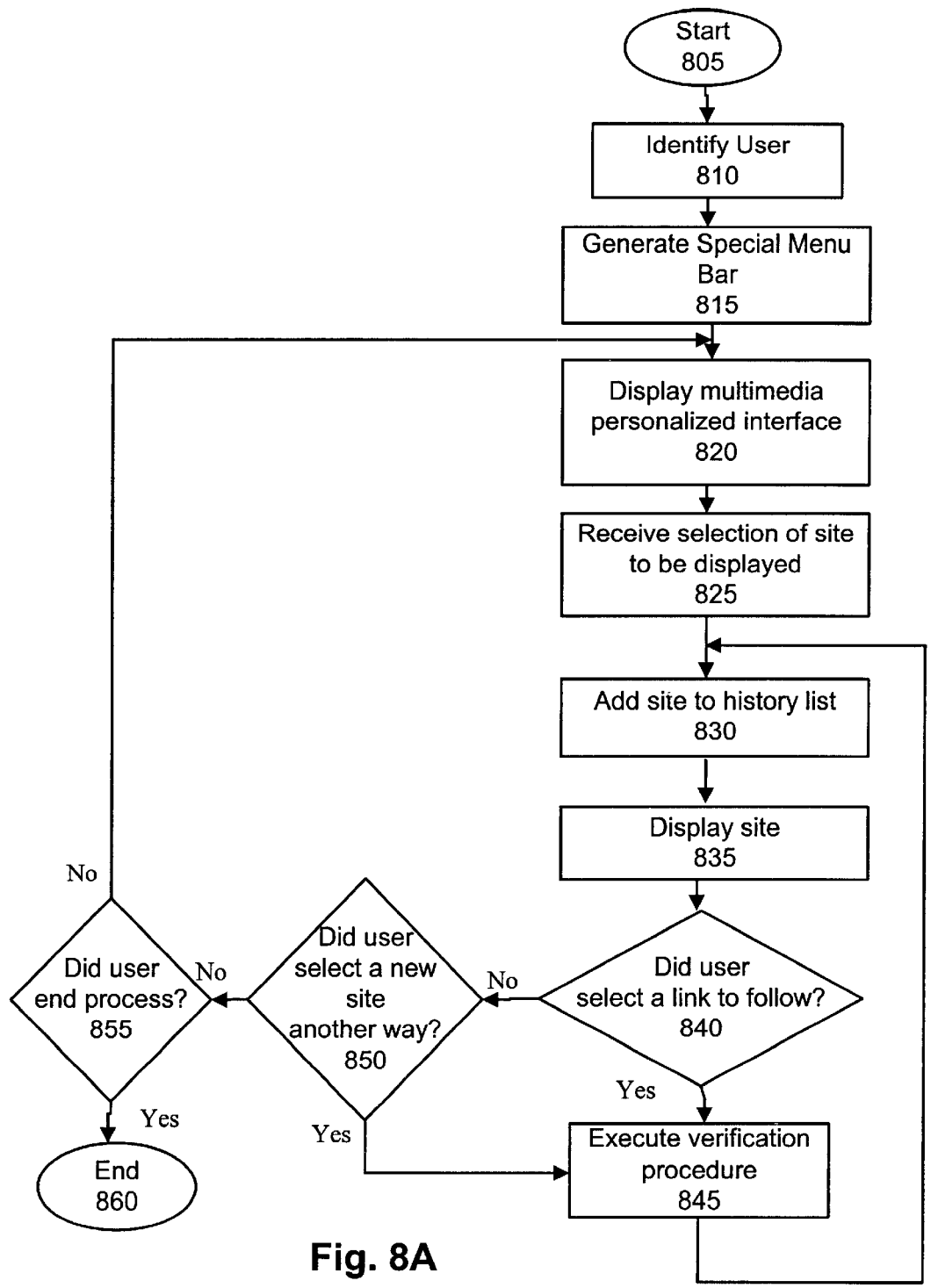
FIG. 8A is a flowchart of one embodiment of using the present system.

FIG. 8A is a flowchart of one embodiment of using the present system. The process starts at block 805, when a user opens a browser or a special application.

At block 810, the user is identified. For one embodiment, multiple users may have personalized interfaces to the system. In that instance, the user may identify himself or herself with a password, biometric data, or in another way. For one embodiment, if there is only a single user, this step may be skipped.

At block 815, a special menu bar is generated. For one embodiment, the system may include its own browser connection to the network, and this menu bar may be part of that browser. For another embodiment, if the user is accessing the system through a standard browser, the existing menu and button bars of the browser are disabled and/or hidden. In this way, the accesses to subsequent sites can be more easily controlled. For one embodiment, the special menu bar is generated in HTML. For one embodiment, the special menu bar is generated in a separate frame.

At block 820, a multimedia personalized interface is displayed. This personalized interface is described in more detail below with respect to FIGS. 10–12. The personalized interface may include navigation images, may be interactive, and may be customized by a child. For one embodiment, the personalized interface may be based on a plurality of templates or themes, which may be further personalized.

Figure 8B:
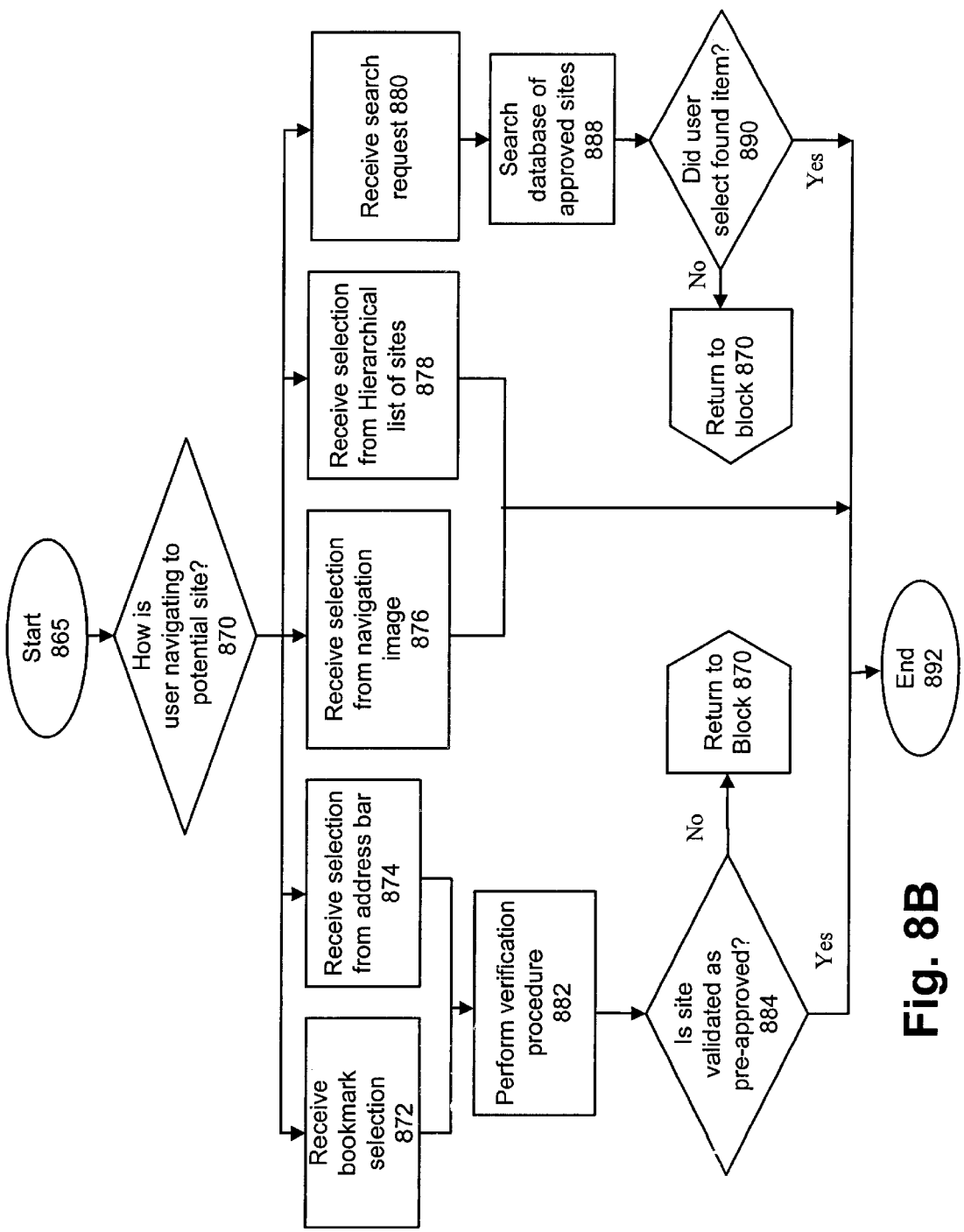
FIG. 8B is a flowchart of one embodiment of the selection process in FIG. 8A.

At block 825, a selection of a site to be displayed is received. For one embodiment, this is only one of the choices that may be made by the user. FIG. 8B is a flowchart of one embodiment of a the steps leading to the selection of a site to be displayed. This step incorporates the step of validating that the site should be displayed to the user (for one embodiment, as described below in FIG. 9.)

At block 830, the site is added to a history list. The history list, or cache, maintains a list of recently visited sites. This is useful to reduce the time to validate access to sites that are often visited by a user. For one embodiment, this step may be skipped.

At block 835, the site is displayed. For one embodiment, certain links that have been found to be unacceptable may be grayed out, or otherwise made inaccessible.

At block 840, the process determines whether the user has selected a new link to follow. If the user has selected a link, the process continues to block 845. At block 845, the verification procedure is executed. The process then continues to block 830.

If the user did not select a link at block 840, the process continues to block 850. At block 850, the process determines whether the user selected a new site to visit in another way. If the user selected a new site to visit, the process continues to block 845. Otherwise, the process continues to block 855. At block 855, the process determines whether the user ended the process. If the user ended the process, the process continues to block 860, the cache is purged, and the window is closed. If the user did not end the process, the process continues to block 820. Of course, this series of activities is invoked by a user action. The user can look at the presently open page for any period of time.

FIG. 8B is a flowchart of one embodiment of the selection process in FIG. 8A. The process starts at block 865. This process is one embodiment of the "select a site" block 825 if FIG. 8A.

At block 870, the process determines how the user is navigating to a potential site. The choices include receiving selection via: a bookmark, address bar, navigation image, hierarchical list of sites, or via a search request.

At block 872, a selection of a site is received from a bookmark selection. The bookmarks are a list of URLs compiled by the user. However, although at a previous time these sites may have been approved, their approval status may have changed. Thus, at block 882, a verification procedure is performed for the site selected. This procedure determines whether the site is approved, or not.

At block 884, the process determines whether the site is validated or not. If the site is validated, the process ends at block 892, thus returning to the selection process, for example as illustrated at FIG. 8A. If the site is not found to be approved, the process returns to block 870, permitting the user to select another site. This prevents the unapproved site from being displayed to the user.

An alternative method of navigating to a potential site is by receiving a selection from an address bar 874. For one embodiment, this option may not be offered. If this option is offered, the user can simply type in a URL. The process then continues to block 882, where the verification procedure is preformed.

Yet another alternative method of navigating to a potential site is by receiving a selection from a navigation image 876. The navigation images permit "topic based" or "image based" navigation. Thus, for example, a navigation image of a dictionary would lead the user to an approved dictionary site. If a selection is made from a navigation image 876, since only approved sites are connected to a navigation image, the process continues directly to block 892, where the process ends.

Another alternative method of navigating to a potential site is by receiving a selection from a hierarchical list of sites 878. The hierarchical list of sites permits a user to view the sites in the approved site database. If a selection is made from the hierarchical list of sites 878, since only approved sites are in the list, the process continues directly to block 892, where the process ends.

Using a search request 880 is another alternative method of navigating to a potential site. At block 888, the database of approved sites is searched, to find matching sites for the search request, and the search results are displayed.

At block 890, the process determines whether the user selected an item found by the search. If the user selects an item found by the search request, the process continues to the end, at block 892. Otherwise, the process returns to block 870.

Figure 9:
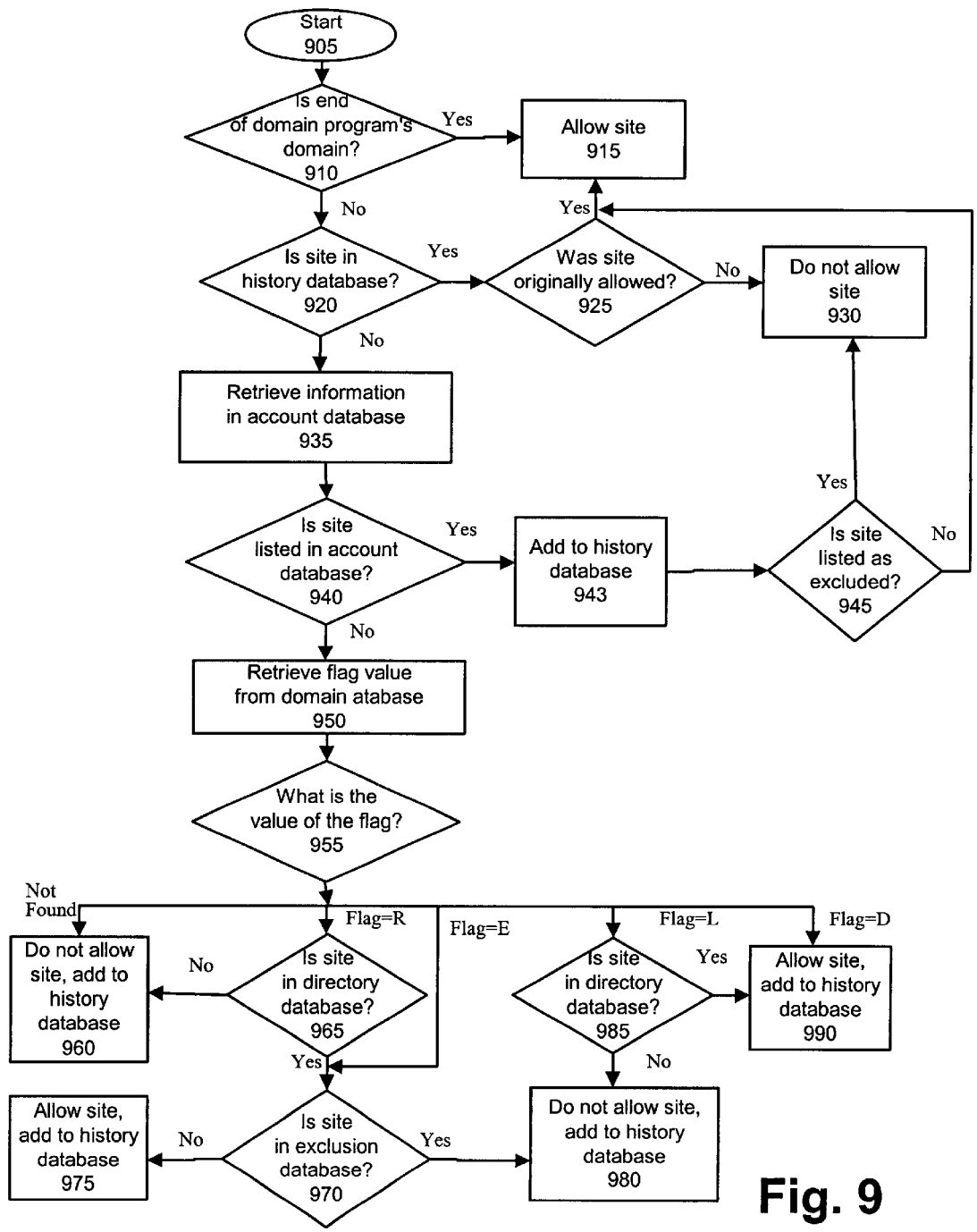
FIG. 9 is a flowchart of one embodiment of site validation.

FIG. 9 is a flowchart of one embodiment of site validation. The process starts at block 905.

At block 910, the process determines whether the end of the domain of the URL requested is the end of the program's own domain. Generally, URL's are the format of <protocol>://<domain><directory>, where the format of protocol may be http, ftp, or another format. The format for the domain may be any format, such as "www.thekc.com", or another format. The directory may be any extension such as "/faq/" while the page is "comparison.htm", thereby forming the URL: http://www.thekc.com/faq/comparison.htm. Of course, some sites may not include a directory, or a page.

The program's own domain is the domain of the supplier of the present pre-screening program. For one embodiment, this domain is the kidsconnection.com domain. Thus, if the domain is the kidsconnection.com domain, the process permits access to the requested site, at block 915. Otherwise, the process continues to block 920.

At block 920, the process determines whether the URL is in the history database. For one embodiment, the history database is user specific. Thus, finding the item in the history database indicates that the user had visited or attempted to visit the site recently. For one embodiment, one hundred sites are listed in the history database. Alternatively, another number of sites, from ten to ten thousand or more, may be listed in the history database. If the site is not found in the history database, the process continues to block 935.

Otherwise, the process continues to block 925. At block 925, the process determines whether the site was allowed the last time it was visited. For one a embodiment, the history database includes sites that were permitted access and sites to which access was denied. The history database may include two separate databases, one for sites allowed and one for sites to which access was denied. For another embodiment, each listing may include a flag, indicating whether the site was acceptable or not.

If the site was allowed according to the history database, the process continues to block 915, and access is permitted. If the site was not acceptable according to the history database, the process continues to block 930, and access is denied.

At block 935, the system retrieves information from the account database for this particular user. As discussed above, for one embodiment, multiple users may be using the same system. However, at this point, as shown for example in FIG. 8, the system has identified the user in question.

At block 940, the process determines whether the URL requested is listed in the account database for the particular user. If the URL is listed in the account database, the process continues to block 943. Otherwise, the process continues to block 950. At block 943, the site is added to the history database.

At block 945, the process determines whether the URL listed in the account database is listed as excluded or not. The two options for listing URLs is as Excluded or Included. If at block 945 the account found the URL listed as excluded, the process, at block 930, denies access to the site. Otherwise, at block 915, access to the site is allowed.

If at block 940, the URL was not found in the account database, the process continues to block 950.

At block 950, flag values are retrieved from the domain database. The domain database includes domains for the sites that are acceptable, to which access is allowed.

At block 955, the process determines what the value of the flag was for the URL domain requested by the user.

If the flag was not found, i.e. the domain was not found in the database, the process continues to block 960, and the site is not allowed. The site is added to the history database as well at this time, as a site to which access was denied.

If the flag is an D, indicating that all directories within the requested domain are acceptable, the process continues to block 990, and access is granted to the site. The site is added to the history database as well at this time, as a site to which access was granted.

If the flag is an R, indicating that not all directories within the domain are acceptable, and that at least some of the directories are specifically excluded, the process continues to block 965. At block 965, the process determines if the directory is in the database, as an acceptable directory for access. If the directory is not in the database, the process continues to block 960. At block 960, the site is not allowed, and is added to the history database as such.

If, at block 955, the flag was an E flag, indicating that most of the directories/pages within the domain are acceptable, but that at least some of the sub-directories/pages are specifically excluded, the process continues to block 970.

If at block 955, the flag was an L flag, indicating that not all directories/pages within the domains are acceptable, the process continues to block 985.

At block 985, the process determines whether the directory is in the database. If the site is in the database, the process continues to block 990, and allows the site. If the site is not in the database, the process continues to block 980, and the site is not allowed.

Please note that for one embodiment in the above flowchart, when access is denied to a site, this information may be displayed, or the user may be returned to the previous screen. If access is allowed, the site is accessed, and the information is displayed to the user.

Figure 10:
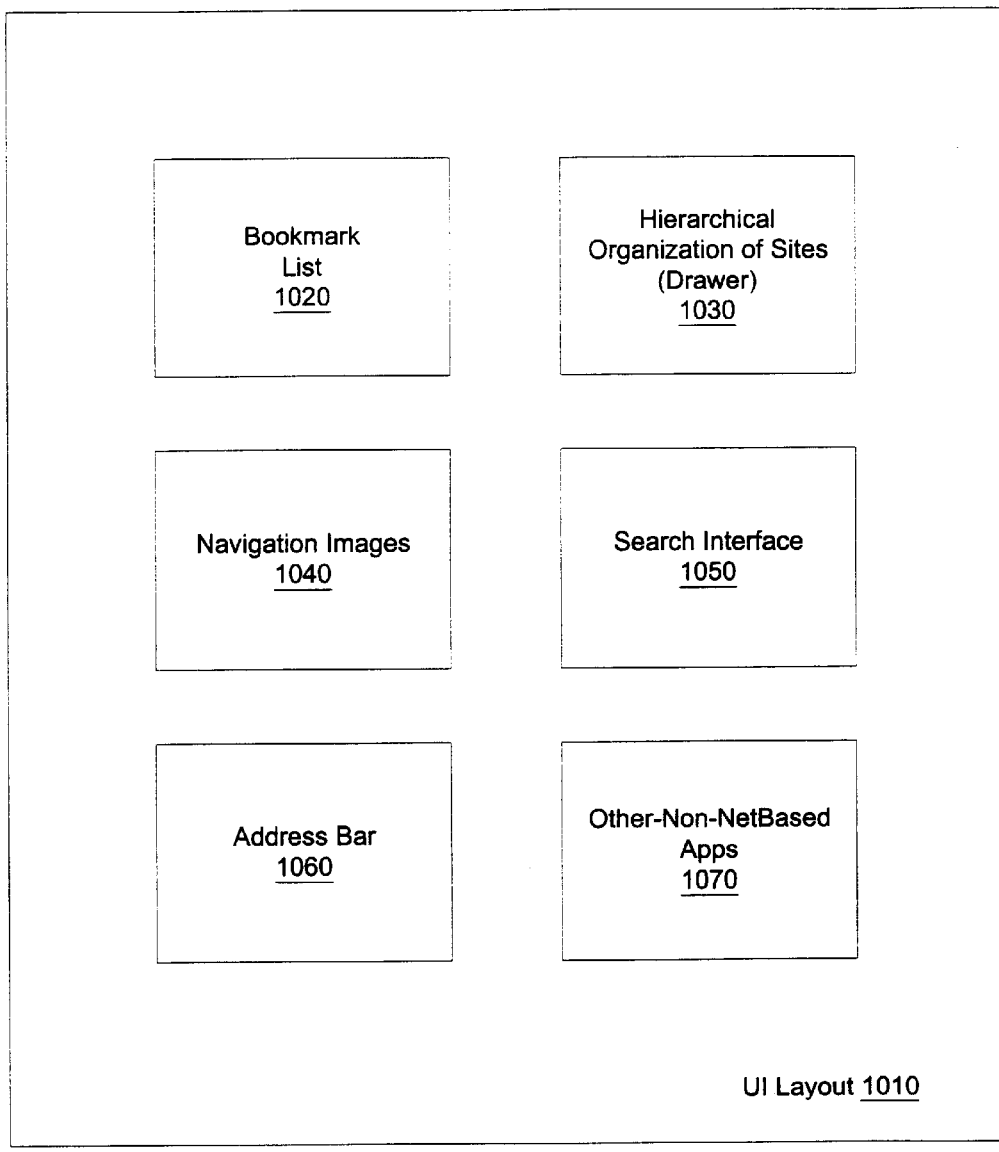
FIG. 10 is a block diagram of one embodiment of a user interface.

FIG. 10 is a block diagram of one embodiment of a user interface. A user interface is associated with each user who is in an account. Thus, for example, the master user may have a particular user interface layout, while the two children may have separate accounts and user interface layouts. The user interface described below is highly personalizable. Sample images of user interfaces are shown below in FIGS. 11–13.

The user interface layout 1010 may include a bookmark list 1020. The bookmark list 1020 may include sites, as organized by the user, that are often visited by the user.

The UI layout 1010 may further include a hierarchical organization of sites. For one embodiment, this may be shown as a set of drawers including folders, which may include further folders. For one embodiment, all pre-screened sites may be included in this organization of sites. For another embodiment, only sites selected by the user may be included in this organization of sites.

The UI layout 1010 may further include navigation images 1040. Navigation images 1040 may represent categories which include sites, or may represent items within the client computer. Thus, for example, navigation images may include a telephone, permitting access to a list of contacts, a football, permitting access to a site that has information about football. Such navigation images 1040 may be useful to permit children an intuitive interface. The navigation images 1040 may be customized by the child.

A search interface 1050 may also be included. The search interface 1050 limits its search to the pre-screened sites within the server database. Thus, any items found by the search interface 1050 may be directly accessed by the user.

An address bar 1060 may also be included. The address bar permits direct entry of a URL.

The UI layout may include other, non-Net-based applications 1070, which may be provided to the user. In this way, a single, customizable user interface 1010 may provide access to all of the resources available to a user.

Figure 11:
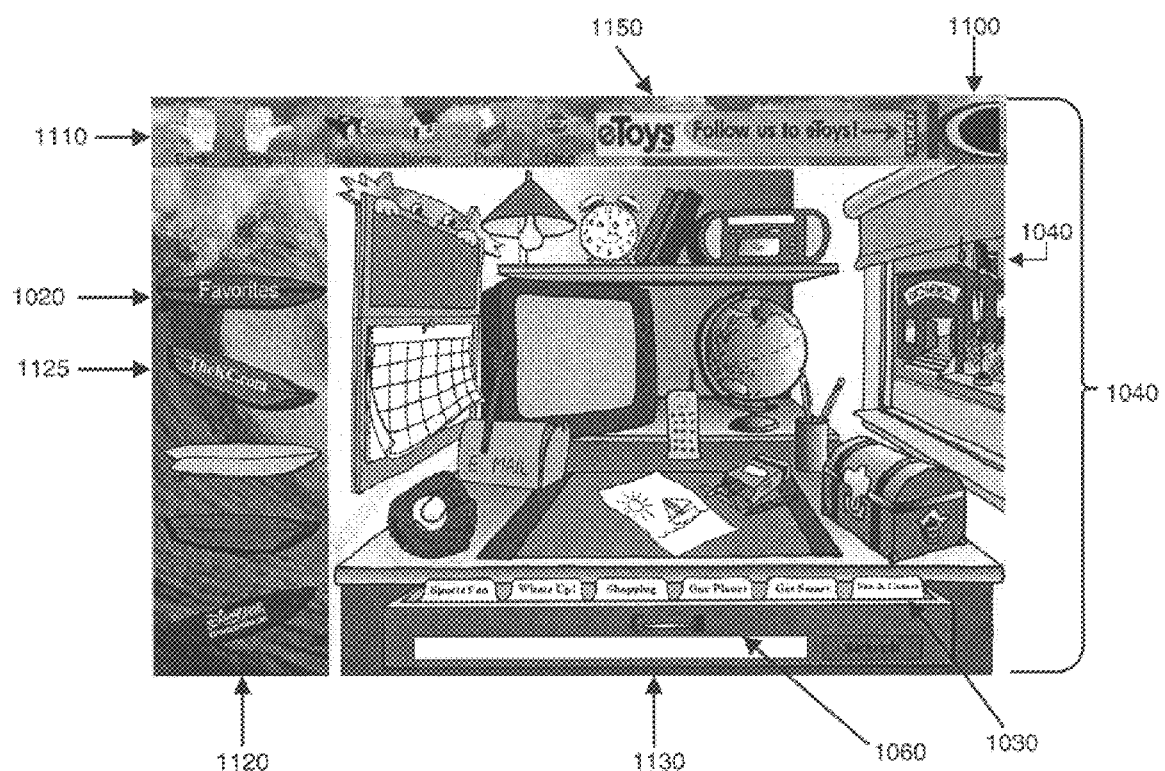
FIG. 11 is an illustration of one embodiment of a user interface.

FIG. 11 is an illustration of one embodiment of a user interface. The screen display 1100 has multiple portions. Navigation bar 1110 includes navigation icons. For one embodiment, navigation bar 1110 may also include advertising 1150, which refers the user to an advertiser's approved page. Side navigation bar 1120 further includes icons 1125. For one embodiment, the icons 1125 may include a bookmarks icon 1020. The main window 1040 includes a plurality of navigation icons. As can be seen in this example, the main window 1040 has a theme, in this instance an office. Alternative themes may be used. The placement of the individual navigation icons 1040 may be moved by the user, or organized. Furthermore, the appearance of various icons may be altered. This type of personalization is known. For one embodiment, the navigation icons includes a hierarchical organization of sites 1030, e.g. a drawer with folders. The user can access various approved sites through this drawer 1030. For one embodiment, the drawer 1030 may further include a search interface 1050, which permits a user to search within the list of allowed sites.

Figure 12:
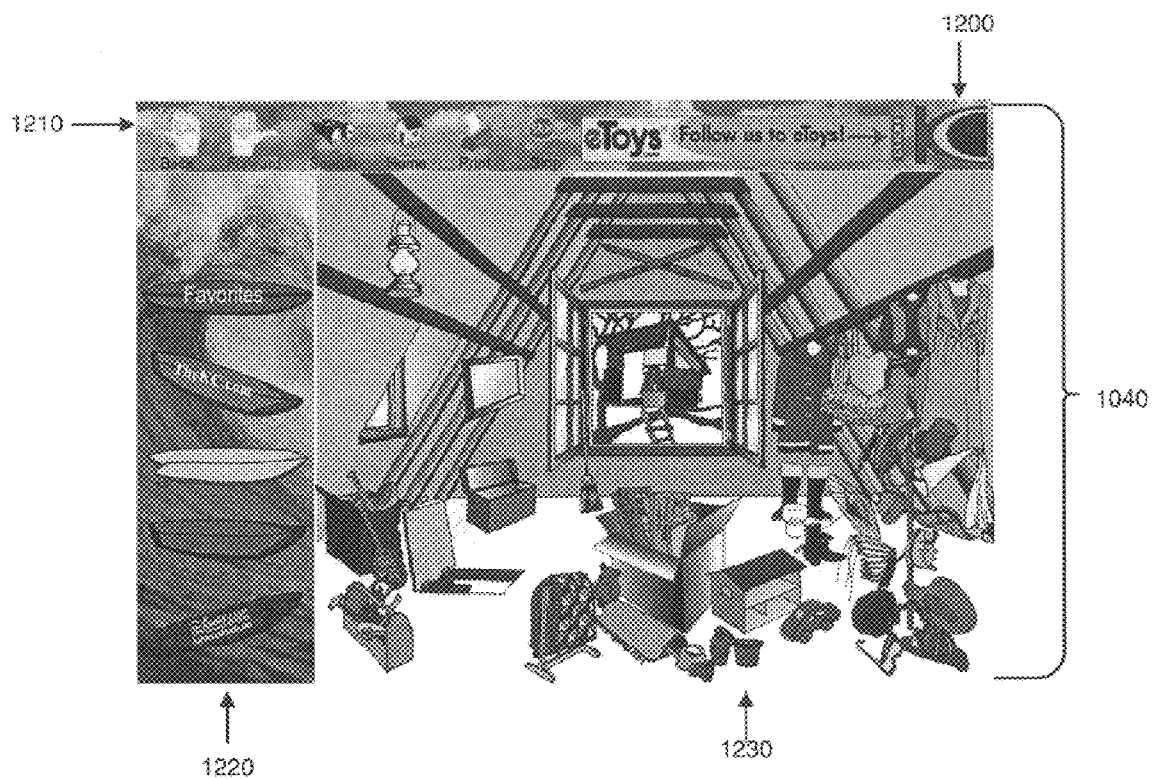
FIG. 12 is an illustration of another embodiment of a user interface.

FIG. 12 is an illustration of another embodiment of a user interface. As can be seen, the theme for this user interface layout is "attic." It too includes the main navigation bar 1210 and a side navigation bar 1220. It also includes various navigation icons 1040 in the main window 1230. The user can select the navigation images, and the functions associated with the images. Thus, for example, the user may select the box with games as the navigation image that leads to on-line games. The tool box image may be used to access mental tools. Alternative affiliations of images may be used. For one embodiment, the user can select from a variety of themes and a variety of images within each theme, and locations for each of the images, to create a personalized and useable user interface.

Figure 13:
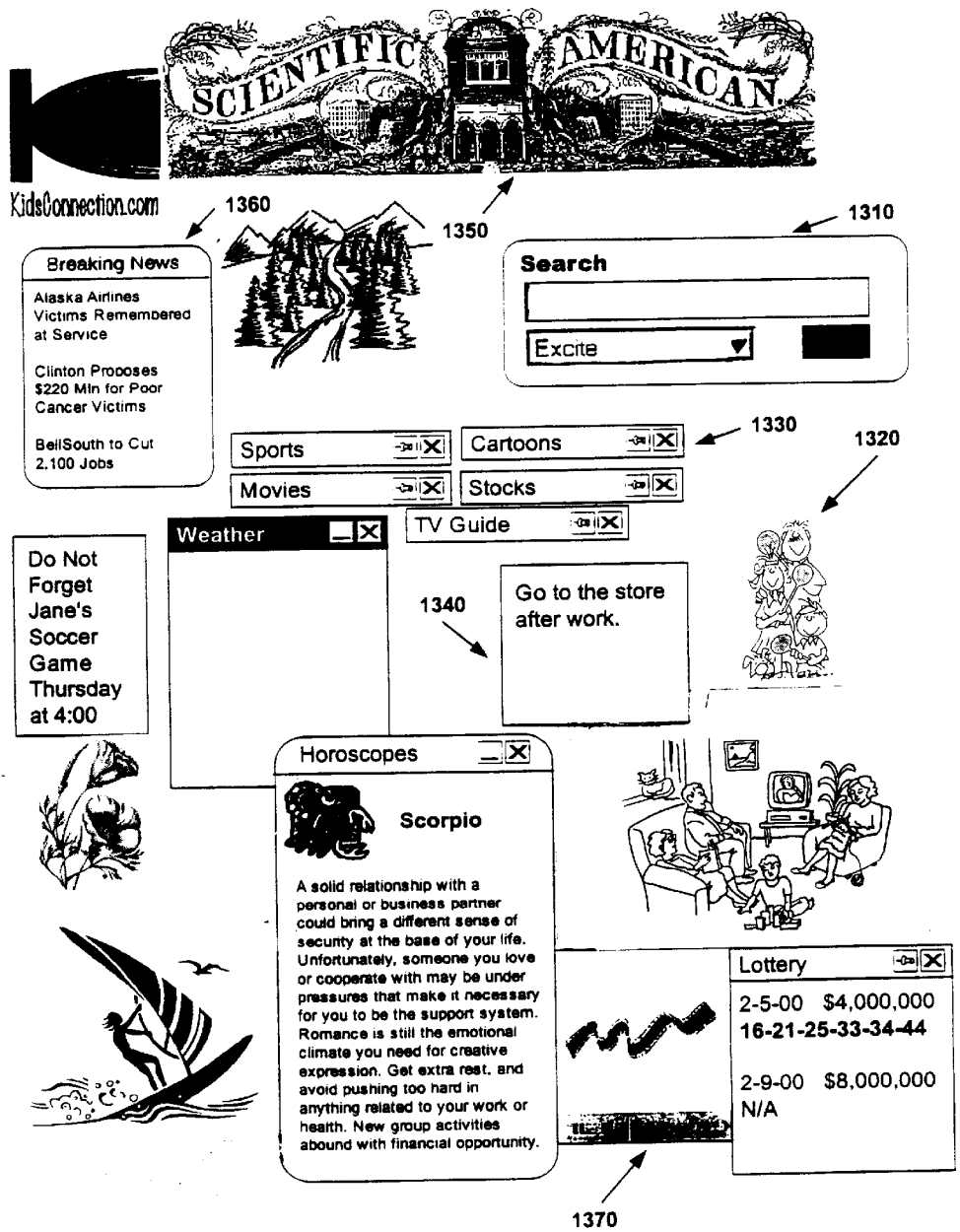
FIG. 13 is an illustration of another embodiment of a user interface.

FIG. 13 is an illustration of another embodiment of a user interface. For one embodiment, this is the user interface for a master user. However, any user may configure his or her system to present a similar interface. The interface includes a search bar 1310, which may permit the user of standard search engine(s). For another embodiment, for a user with restricted access, the search bar 1310 only permits search of the acceptable sites within the system. The user interface further may include an advertising bar 1350, various images 1320 and data 1360, 1340, added and positioned by the user. The user interface may further include multimedia data 1370, and other types of information. In this way, the user can create an interface that suits him or her.

Figure 14:
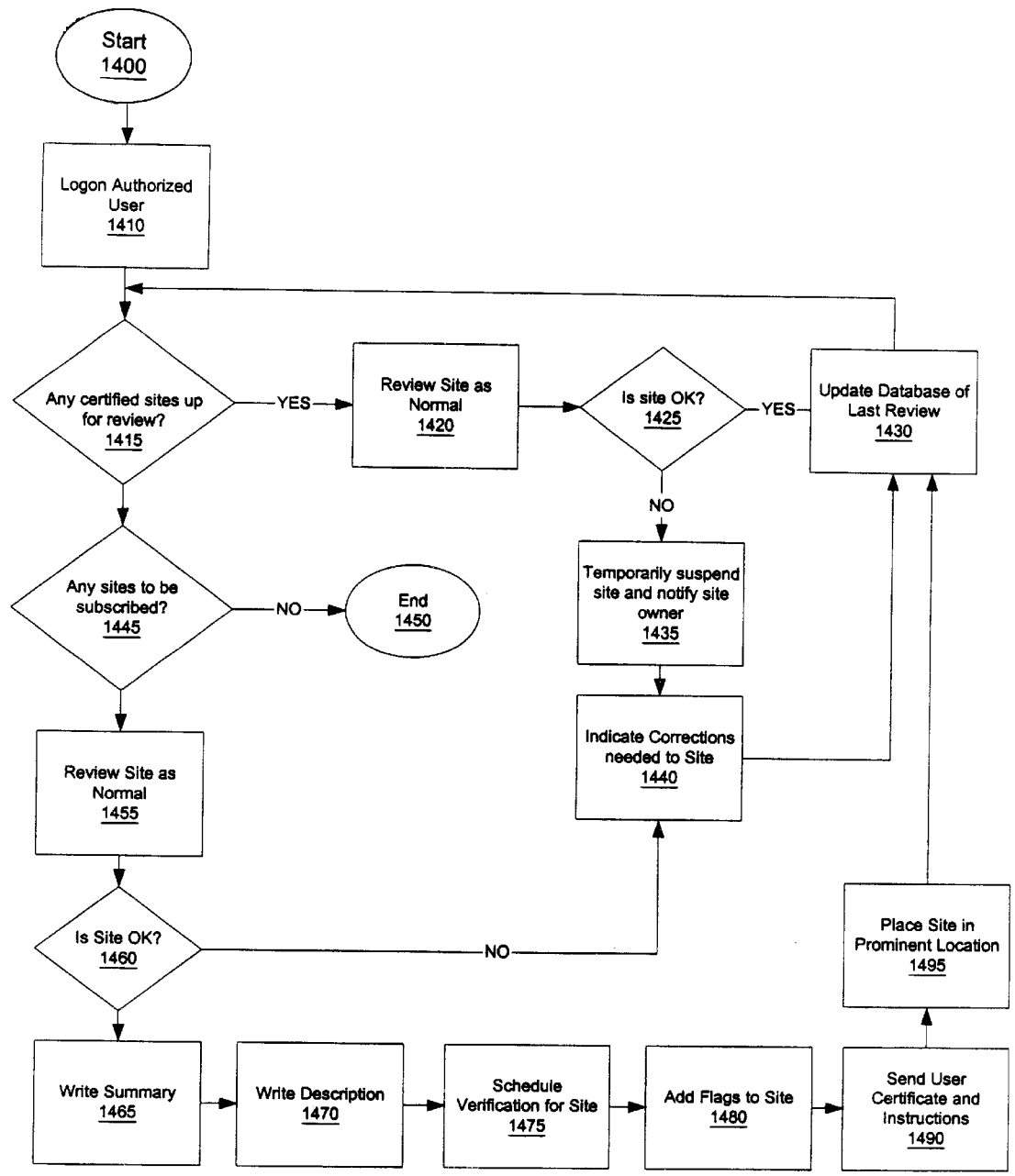
FIG. 14 is a flowchart of a subscription mechanism for an Approval Certification.

FIG. 14 is a flowchart of a subscription mechanism for an Approval Certification. The process starts at block 1410, when an authorized user logs into the system.

At block 1415, the process determines if there are any certified sites that are due for review. For one embodiment certified sites are hand reviewed, to make sure that no certified sites have any bad data. For another embodiment, the certified sites are treated the same as normal sites, as described above. For one embodiment, certified sites are reviewed prior to non-certified sites. For one embodiment, a certified site is only removed from the list of approved sites if after a hand review the certified site is found to be inappropriate. If there are no certified sites to review, at block 1415, the process continues to block 1445. Otherwise, the process continues to block 1420.

At block 1420, the site is reviewed as normal. This process is described above. At block 1425, the process determines whether the site is acceptable, e.g. eligible to retain the certified mark. If the site is OK, the process continues to block 1430, and the database is updated, to reflect the date of review. This process is described above as well. The process then returns to block 1415.

If the site is found not to be OK at block 1425, the process continues to block 1435. At block 1435, the site is temporarily suspended, and the certification mark is removed from the site. For one embodiment, the site is notified of the suspension. For another embodiment, the suspension may be permanent, and the site owner may have to reapply for a certification mark, in order to be readmitted.

At block 1440, the corrections to the site that would make the site certifiable again are indicated. For one embodiment, for example, if a certain portion of the site is not acceptable, this is indicated. In this way, the certified site can easily correct the defect(s) that led to the removal of the certification mark. For another embodiment, this step may be skipped.

The process then continues to block 1430, where the suspension is entered into the database.

If, at block 1415, no reviews were found, the process continued to block 1445. At block 1445, the process determines if there are any more sites applying for the certification mark. If no further sites remain to be reviewed, the process ends at block 1450. Otherwise, the process continues to block 1455.

At block 1455, the site is reviewed as normal. At block 1460, the process determines whether the site is OK. For one embodiment, in order to receive a certification, all of the pages linked from the certified page must be found acceptable. Alternatively, a certain page may be certified, even if it has dependent pages which are not acceptable.

If the site is not OK, the process continues to block 1440. At block 1440, the applicant for the certification mark is notified that the site was not certifiable, and for one embodiment, the notification specifies the corrections needed to obtain a certification. The process then continues to block 1430, and the site is entered into the database as an unacceptable site.

If the site was found to be acceptable at block 1460, the process continued to block 1465. At block 1465, a summary of the site is written. At block 1470, a description of the site is written. At block 1475, verification is scheduled for the site. For one embodiment, these steps are identical to steps executed for any site in the database. For another embodiment, the summary/description of the site may be more detailed for certified sites. At block 1480, flags are added to the site.

At block 1490, the user certificate and instructions are sent to the site. In this way, the site is notified that the application for certification has been approved, and that the user should place the certification mark on the web site.

At block 1495, the site is placed in a prominent position. For one embodiment, a list of certified sites is separately placed on the user interface, such that the user is more likely to visit certified sites. For another embodiment, a certification mark is placed on the user interface, such that the user can access the summaries of all sites that are certified with a single click. Alternative means of bringing attention to certified sites may be used. The process then continues to block 1430, and the site is placed in the database, as described above.

Generally, certification is provided for a fee. Thus, in addition to updating the database at block 1430, the certified site's account may further be debited. For one embodiment, the subscription is on a per-day or per-month basis, such that the site owner only pays while the site is certified.

Figure 15:
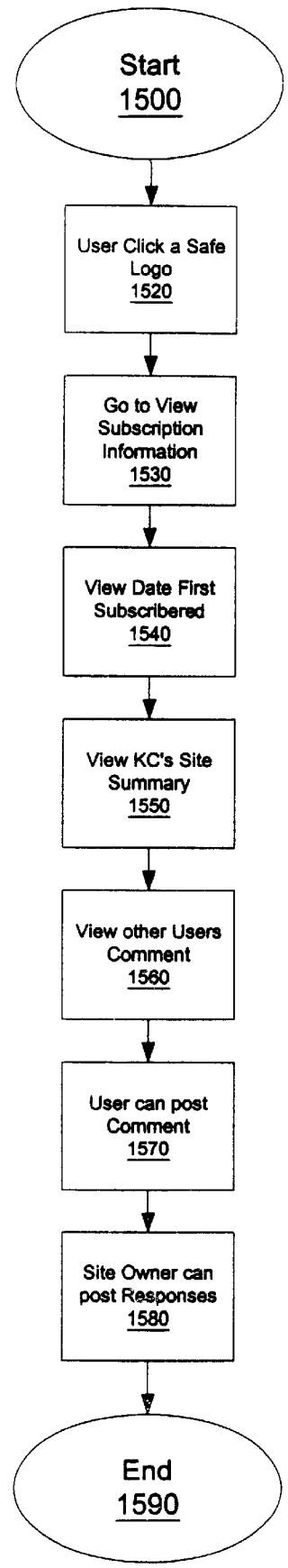
FIG. 15 is a flowchart of a review process for sites that have an Approval Certification.

FIG. 15 is a flowchart of a review process for sites that have an Approval Certification. The process starts at block 1510. At block 1520, the user clicks a safe logo. For one embodiment, the safe logo is placed on the user interface display.

At block 1530, subscription information is displayed to the user. For one embodiment, this step may be skipped.

At block 1540, the date of first subscription may be viewed for a particular site.

At block 1550, the summary for the site may be viewed. For one embodiment, when a user clicks the safe logo, the summaries is the first data displayed. The user can find out further information, such as standards for subscription, dates of subscription for each of the certified sites, etc from this page.

At block 1560, the user may select to view other user's comments on the subscribed sites. These comments may indicate that the user liked or disliked the page, recommendations, etc. For one embodiment, the comments may be screened by the system for inappropriate language, etc.

At block 1570, the user can post comments about the site.

At block 1580, the site owner may add remarks or responses to the comments, or otherwise review the summary and comments left by the user. For one embodiment, the system may send a copy of the user comments to the site owner on a regular basis. This permits the certified site to respond to user comments, and/or to easily realize what users think about the site. The process ends at block 1590.

In this way, a site may subscribe to the certification mark provided by the system. This certification mark may appear in various formats. For one embodiment, it is a simple logo that indicates that the site has been certified as safe by the Kids Connection.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of providing only pre-screened content comprising:
    maintaining a database on a server including a database of a plurality of pre-screened sites;
    when a universal resource locator (URL) is received from a user:
        determining if the URL is in a history database of allowed sites for the user;
        if the URL is not in the history database, determining whether the URL is in the database as one of the plurality of pre-screened sites; and
    if the URL represents one of the plurality of prescreened sites, displaying data associated with the URL, otherwise, not displaying the data.

2. The method of claim 1, further comprising:
    adding the URL to a history database if the URL was not in the history database, including an indication of whether the site was allowed or not allowed.

3. The method of claim 2, further comprising:
    maintaining an account database of excluded and included sites for a specific user on the server;
    determining if the URL is specifically excluded or included by the user by testing if the site is in the database of excluded sites; and
    not displaying the site if the site is in the account database as an excluded site.

4. The method of claim 2, wherein the database comprises:
    a domain database; and
    a directory database.

5. The method of claim 4, wherein the domain database further includes a flag, indicating a type of verification needed for the site.

6. The method of claim 5, wherein determining whether the URL is in the database comprises:
    determining if the URL is in the domain database; and
    if the URL is in the domain database, determining the flag associated with the domain; and
    performing further verification based on the flag, to determine if the site should be displayed.

7. The method of claim 6, wherein the further verification comprises:
    if the flag indicates that all directories within the domain are allowable, displaying the site; and
    if the flag indicates that only-certain directories within the domain are allowable, determining if the directory is in the directory database, and displaying the site only if the directory is in the directory database.

8. The method of claim 7, wherein the flag further indicates whether any of the directories in the domain are in an exclusion database, which contains specific exclusions, on a user-by-user bases.

9. The method of claim 1, wherein the database comprises a plurality of database accessed through a network.

10. The method of claim 1, wherein the history database is on a local client computer.

11. The method of claim 1, wherein the history database is purged periodically.

12. The method of claim 1, wherein the history database is purged after each session.

13. The method of claim 1, wherein the history database is on a server.

14. A method of providing content comprising:
    receiving a URL;
    connecting to a server;
    determining if the URL is in a database on the server as an approved site, comprising:
        determining if a domain of the URL is in a domain database;
        if the domain is in the domain database, determining a flag associated with the domain indicates that all directories within the domain are acceptable, or whether a directory database should further be tested; and
        based on the flag, allowing the site, if appropriate. connecting to the site associated with the URL if the URL is an approved site.

15. The method of claim 14, wherein the flag further indicates whether the domain has any exclusions associated with it.

16. The method of claim 15, further comprising an exclusion database storing user-specific exclusions.

17. A method of providing content comprising:
    receiving a URL from a user;
    determining if the URL is in a historical list of URLs for the user, to which permission to connect has been granted; and
    connecting to the URL if the URL is in the historical list as a pre-screened site.

18. The method of claim 17, further comprising, if the URL is not on the historical list:
    determining if the URL is in a list of approved URLs; and
    connecting to the URL if the URL is in the list of approved URLs.

19. The method of claim 18, wherein the list of approved URLs comprises a database on the server.

20. The method of claim 18, wherein determining if the URL is the list of approved URLs comprises:
    determining if URL is excluded for an account associated with the current user.

21. An apparatus for providing pre-screened content comprising:
    a client comprising:
        a user interface for receiving an address selection from a user;
        a history database of allowed sites for the user;
        a server interface for providing the address selection for verification to a server if the address selection is not in the history database;
    the server comprising:
        a database listing a plurality of URLs of pre-screened allowable sites;

domain validation logic for determining whether the address selection is in a database, and thus may be displayed to the user; and the client for displaying a site associated with the address selection if the history database includes the address selection or if server determined that the site may be displayed to the user.

22. The apparatus of claim 21, wherein the database comprises:

a domain database including a plurality of acceptable domains.

23. The apparatus of claim 22, wherein the domain database includes a flag for each domain of the plurality of acceptable domains.

24. The apparatus of claim 23, further comprising:

a directory database including a plurality of directories;

wherein the flag indicates whether all directories in the domain are acceptable, or the directory database should be queried for the directory of the requested URL.

25. The apparatus of claim 23, further comprising:

an exclusion database including a plurality of excluded directories, the exclusion database being user-specific;

wherein the flag indicates whether all directories in the domain are acceptable, or the exclusion database should be queried for the directory of the requested URL.

26. A server comprising:

a database listing a plurality of pre-screened allowable sites;

a domain validation logic for receiving a universal resource locator (URL) from a user and for determining whether the URL is in the database, and thus may be displayed to the user, the domain validation logic including a flag associated with a domain to indicate whether all directories within the domain are acceptable or whether a directory database should be further tested; and if the URL is an allowable site, the server sending an indication to the client.

* * * * *